(12) United States Patent
Langlois

(10) Patent No.: US 11,427,230 B2
(45) Date of Patent: Aug. 30, 2022

(54) BODY STRUCTURE ALLOWING THE PASSAGE OF FLUID OR GAS UNDER PRESSURE AND ASSOCIATED BODY

(71) Applicant: ALSTOM Transport Technologies, Saint-Ouen (FR)

(72) Inventor: Francis Langlois, Faumont (FR)

(73) Assignee: ALSTOM TRANSPORT TECHNOLOGIES, Saint-Ouen (FR)

(*) Notice: Subject to any disclaimer, the term of this patent is extended or adjusted under 35 U.S.C. 154(b) by 288 days.

(21) Appl. No.: 16/676,447

(22) Filed: Nov. 7, 2019

(65) Prior Publication Data
US 2020/0148236 A1    May 14, 2020

(30) Foreign Application Priority Data

Nov. 12, 2018  (FR) ...................................... 1860430

(51) Int. Cl.
| | | |
|---|---|---|
| *B61D 17/08* | (2006.01) | |
| *B61D 1/00* | (2006.01) | |
| *B61D 17/00* | (2006.01) | |
| *B62D 31/02* | (2006.01) | |
| *B62D 47/02* | (2006.01) | |
| *B62D 25/02* | (2006.01) | |

(52) U.S. Cl.
CPC ............... *B61D 17/08* (2013.01); *B61D 1/00* (2013.01); *B61D 17/00* (2013.01); *B62D 25/02* (2013.01); *B62D 31/02* (2013.01); *B62D 47/02* (2013.01)

(58) Field of Classification Search
CPC . B61D 17/00; B61D 1/00; B61D 7/00; B61D 17/04; B61D 17/041; B61D 17/045; B61D 17/048; B61D 17/06; B61D 17/08; B61D 49/00; B61D 27/009; B62D 31/02; B62D 47/02; B62D 25/02; B60H 1/00557; B60H 1/00564; B60H 1/00371; B60H 1/243; B60H 1/246; B60H 1/248
See application file for complete search history.

(56) References Cited

U.S. PATENT DOCUMENTS

| | | | | |
|---|---|---|---|---|
| 3,807,490 | A * | 4/1974 | Engel | B61D 27/0018 |
| | | | | 165/202 |
| 5,383,406 | A * | 1/1995 | Vanolo | B61D 17/005 |
| | | | | 105/401 |
| 10,124,817 | B2 * | 11/2018 | Yoshida | B61D 17/08 |
| 10,773,736 | B2 * | 9/2020 | Morneau | B61D 17/04 |
| 2016/0052527 | A1 * | 2/2016 | Denker | B60H 1/248 |
| | | | | 454/117 |

FOREIGN PATENT DOCUMENTS

| | | | | |
|---|---|---|---|---|
| DE | 2707573 | A * | 8/1978 | ................ F16S 3/00 |
| DE | 2707573 | A1 | 8/1978 | |
| WO | WO-2009045430 | A1 * | 4/2009 | ......... B60H 1/00564 |

OTHER PUBLICATIONS

INPI Rapport de Recherche Préliminaire for Patent Application No. FR 1860430, dated Jul. 1, 2019, 2 pp.

* cited by examiner

*Primary Examiner* — Zachary L Kuhfuss
*Assistant Examiner* — Cheng Lin
(74) *Attorney, Agent, or Firm* — Soquel Group LLC

(57) ABSTRACT

A bodywork structure for a body for a public transport vehicle, in particular a railway vehicle or a road transport vehicle, for example a guided road transport vehicle, including a wall extending in a longitudinal direction, the wall including at least one cavity extending in the longitudinal direction, wherein the cavity forms a passage for a fluid under pressure, for example a gas under pressure.

12 Claims, 3 Drawing Sheets

BODY STRUCTURE ALLOWING THE PASSAGE OF FLUID OR GAS UNDER PRESSURE AND ASSOCIATED BODY

CROSS-REFERENCE TO RELATED APPLICATIONS

This application claims priority of French Patent Application No. 18 60430, filed on Nov. 12, 2018.

FIELD OF THE INVENTION

The present invention relates to a bodywork structure for a body for a public transport vehicle, in particular a railway vehicle or a road transport vehicle, for example a guided road transport vehicle, comprising a wall extending in a longitudinal direction, and to an associated body.

BACKGROUND OF THE INVENTION

It is sometimes necessary to circulate air in a vehicle through pneumatic ducts, for example, in order to distribute the pneumatic energy to different parts of the train such as seats, doors, brakes, suspensions and other accessories.

To this end, pneumatic ducts fixed on a wall surface facing the vehicle interior are currently known in the prior art, for example fixed by means of mounting brackets, to allow the passage of fluid or gas.

However, said pneumatic ducts take up space. Equipment intended to equip the body, such as a luggage rack, or other interior accessories must therefore circumvent said ducts, which is likely to complicate the geometry of said equipment, for example by requiring clearances or by creating volumes intruding towards the inside of the vehicle and affecting the interior of the passenger compartment.

Furthermore, the fixing of the ducts on the wall requires additional assembly steps during the manufacture of the vehicle.

SUMMARY OF THE DESCRIPTION

One of the aims of the invention is therefore to provide a system for a body that allows the passage of a fluid or a gas, of a reduced size, and that does not complicate the manufacture of the body.

To this end, the object of the invention is a bodywork structure of the aforementioned type in which the wall comprises at least one cavity extending in the longitudinal direction, wherein the cavity forms a passage for a fluid under pressure, for example a gas under pressure.

The pneumatic ducts are thus directly formed in the wall. The integration of the passage for the fluid or compressed gas in this wall can greatly reduce the bulkiness.

Furthermore, it should be noted that the embodiment of cavity(ies) in the wall does not require additional operations in the machining of the wall.

Furthermore, the structure may have one or more of the following characteristics considered individually or in any technically feasible combination:
- the fluid under pressure has a pressure greater than $2\times10^5$ Pa (Pascal) and preferably between $5\times10^5$ Pa and $10\times10^5$ Pa,
- the wall is formed in one piece,
- the wall has a defined length in the longitudinal direction,
- the cavity extends over the entire length of the wall in the longitudinal direction,
- the cavity has a constant profile over the entire length of the wall in the longitudinal direction,
- the wall features a plurality of cavities, at least one group of said cavities forming a reservoir for fluid or compressed gas,
- the wall comprises an inner face, an outer face and ribs connecting the inner face and the outer face, each cavity being formed between the inner face, the outer face and two adjacent ribs,
- the bodywork structure comprises a plurality of cavities, wherein each cavity is isolated from each other cavity, and/or
- the wall comprises at least one opening into the cavity, while a connecting plate is welded to the wall so as to completely cover the opening.

The invention also relates to a body for a railway vehicle or guided road transport vehicle, comprising a bodywork structure as defined above, the cavity comprising a fluid or a pressurized gas, and the wall at least partially defining a vehicle interior of the body.

Furthermore, the body may be such that the cavity is provided at one end with at least one connecting element and/or at least one distribution element and/or at least one end plug.

BRIEF DESCRIPTION OF THE DRAWINGS

Other features and advantages of the invention will become apparent from the detailed description given below, for information only and non-limiting, as shown in the appended figures, among which.

DETAILED DESCRIPTION

Figure 1:
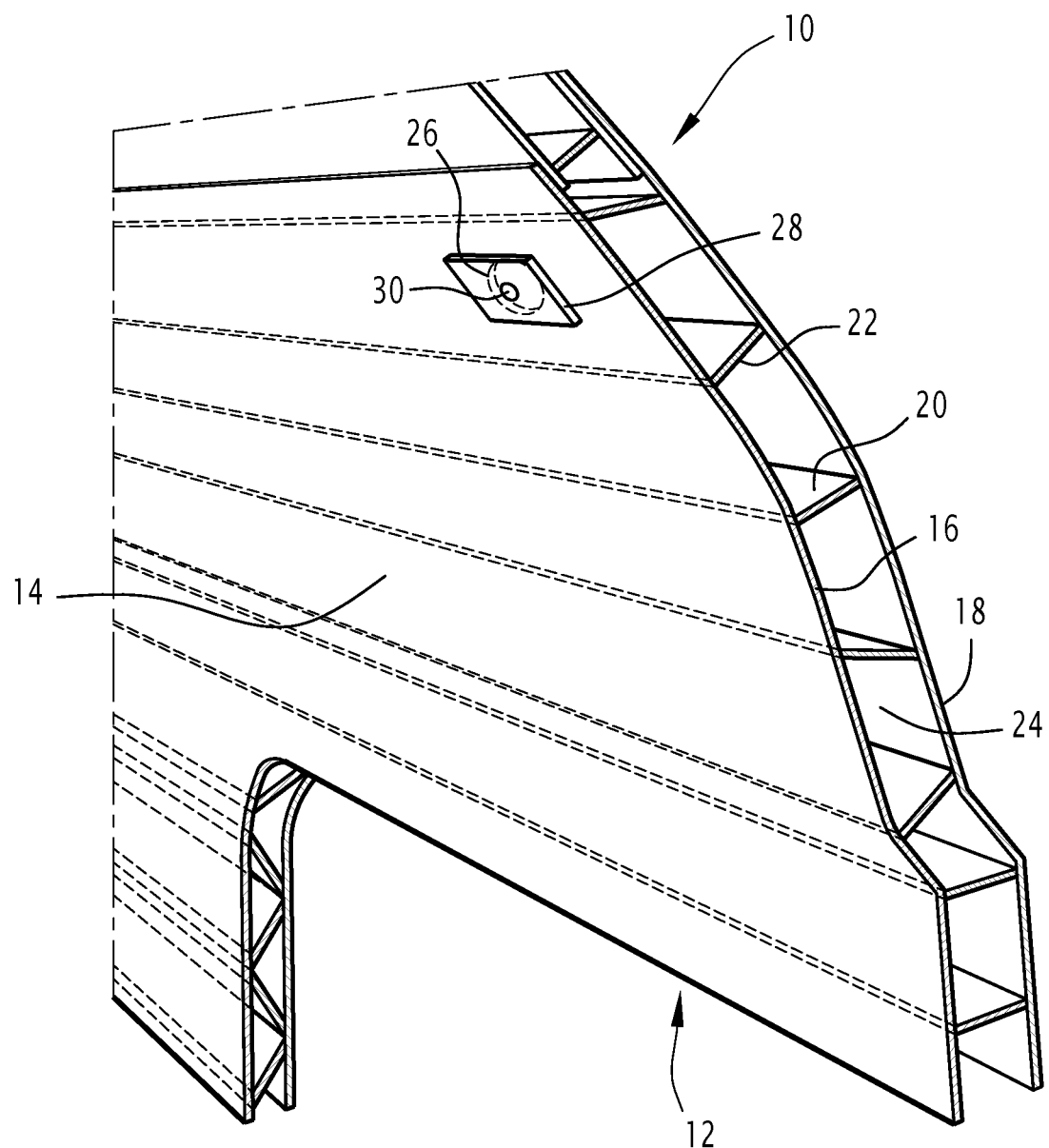
FIG. 1 shows a perspective view of an example of a bodywork structure according to a first embodiment of the invention.
Figure 1:
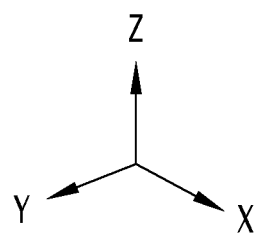

FIG. 1 represents a part of a bodywork structure 10 for a body for a railway vehicle or a road transport vehicle, for example guided, according to a first embodiment of the invention.

The bodywork structure 10 comprises a wall 12 extending in a longitudinal direction X.

The longitudinal direction is, for example, the direction of travel as usually defined for a vehicle. In addition, the elevation direction Z is defined as the direction perpendicular to the running surface of the vehicle, and the transverse direction Y as the direction perpendicular to the longitudinal direction X and elevation direction Z.

The wall 12 may be, for example, a sub-frame, a roof or a face of the body.

The wall 12 delimits, for example at least partially, an interior 14 of the body.

The wall 12 has a defined length in the longitudinal direction X. This wall 12 extends, for example, over the entire length of the body.

The length of the wall 12 is, for example, between 15 and 20 meters.

The wall is formed in one piece, for example by extrusion.

Alternatively, the wall may be formed of a plurality of parts, for example made by extrusion, and then assembled with each other.

The wall may be made, for example, of aluminum.

The wall 12 includes an inner face 16, an outer face 18 and a plurality of ribs 20, 22 connecting the inner face 16 and the outer face 18. The ribs 20, 22 may be parallel to one another, or at least some ribs may not be parallel to other ribs.

The inner face 16 is oriented towards the vehicle interior 14 and the outer face 18 oriented towards the outside of the vehicle.

The wall 12 delimits at least one cavity 24, preferably a plurality of cavities 24, extending in the longitudinal direction X. More particularly, each cavity 24 is formed between the inner face 16, the outer face 18 and two adjacent ribs 20, 22.

Each cavity 24 extends substantially along the entire length of the wall 12 in the longitudinal direction X.

Each cavity 24 extends between two ends in the longitudinal direction X.

Each cavity 24 defines a passage for a fluid or a gas under pressure.

The fluid or gas under pressure has a pressure greater than $2 \times 10^5$ Pa (Pascal) and preferably between $5 \times 10^5$ Pa and $10 \times 10^5$ Pa.

Such values allow, in particular the optimal service and operation of the equipment to be supplied.

Each cavity 24 has a substantially constant profile along the longitudinal direction X along the entire length of the wall.

More particularly, each cavity 24 represents a volume having as its main axis an axis parallel to the longitudinal direction X. The volume is here a cylinder. The base of the cylinder is here a polygon, in particular a quadrilateral, corresponding to a section perpendicular to the longitudinal direction X of the inner face 16, the outer face 18 and two adjacent ribs 20, 22.

Each cavity 24 is isolated with respect to each other cavity. The ribs 20, 22 are particularly impervious to fluids under pressure circulating in the cavities 24.

This allows, in particular, the circulation of different fluids and/or gases in the different cavities.

Alternatively, at least two cavities 24 communicate with each other.

In the example shown, the wall 12 comprises at least one opening 26 into the cavity 24. The opening 26 is here an opening through the inner face 16.

A connection plate 28 is assembled, for example, by welding to the wall 12 so as to completely cover the opening 26. More particularly, the connection plate 28 may be assembled, for example by welding, to the inner face 16 of the wall 12 from the outside of said wall 12; i.e. the side of the inner face 16 facing the vehicle interior 14.

The connection plate 28 is a plate provided with a central orifice 30. The central orifice 30 may be connected, for example, to a duct to allow passage of fluid or gas from the cavity 24 to said duct, or vice versa.

Advantageously, the connection plate 28 comprises a valve for controlling the quantity of fluid or gas passing through the central orifice 30.

The connection plate 28 makes it possible, for example, to tap fluid or gas from the cavity 24 or to supply gas or fluid into the cavity 24 at an intermediate location between the two ends of the cavity 24.

The cavity 24 is provided at at least one of its two ends with at least one connecting element and/or at least one distribution element and/or at least one end plug sealingly closing said end.

More particularly, the cavity 24 is provided at each of its two ends with a connecting element or a distribution element or an end plug.

The connecting element makes it possible, for example, to connect said end of the cavity 24 to the end of a cavity of a bodywork structure of an adjacent body.

Figure 2:
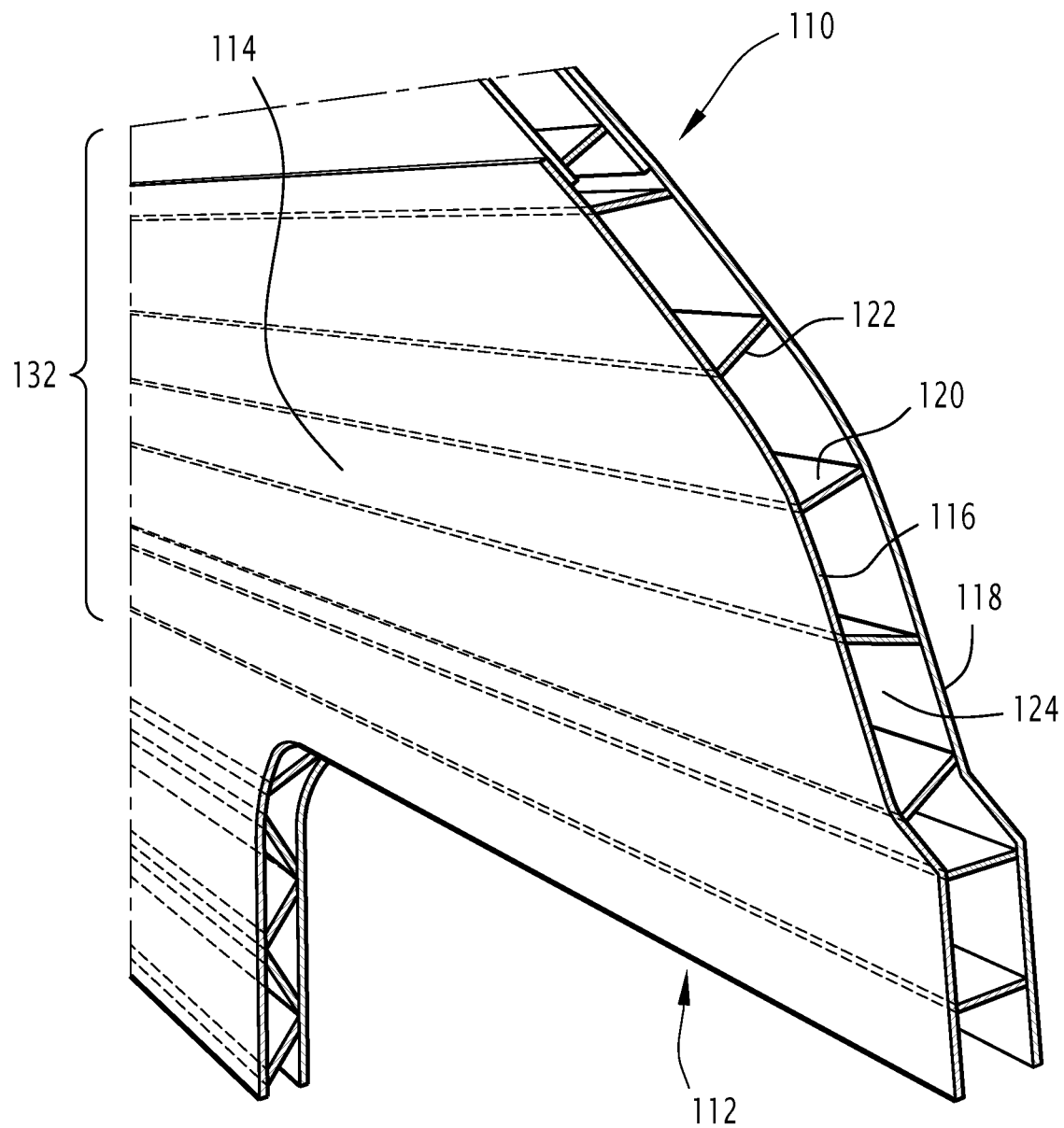
FIG. 2 shows a perspective view of an example of a bodywork structure according to a second embodiment of the invention.
Figure 2:
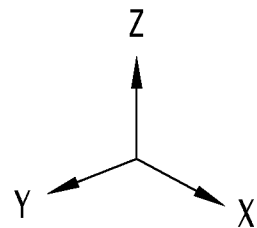
Figure 3:
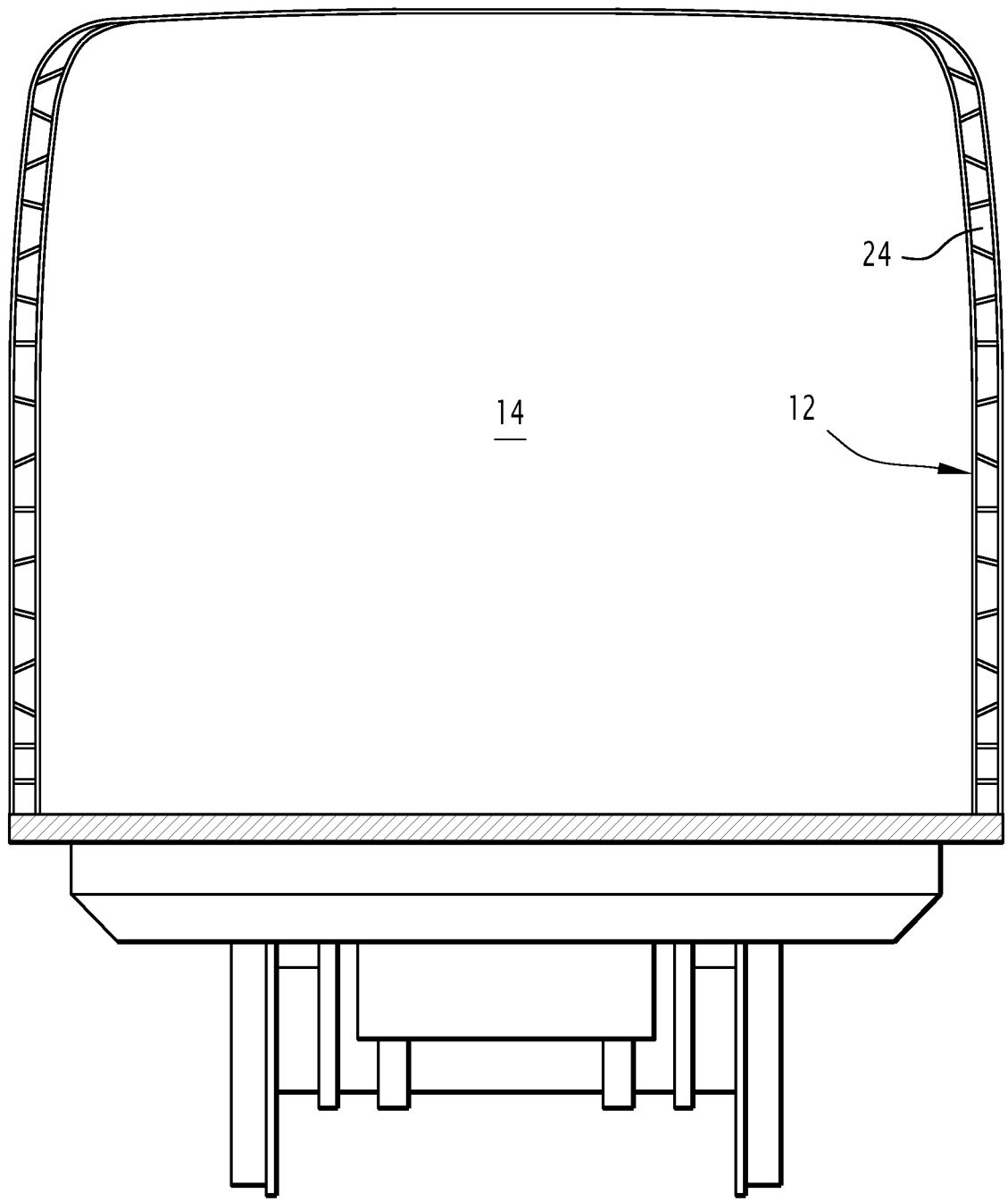
FIG. 3 shows a schematic sectional view of a body with a bodywork structure according to the first embodiment.

A second embodiment of a bodywork structure according to the invention is shown in FIG. 2.

Only the elements by which the second embodiment differs from the first embodiment will be described in the following description.

Identical or similar elements will have the corresponding reference of the first embodiment incremented by 100.

The wall 112 delimits several cavities 124 as described above.

At least one group 132 of the cavities 124 forms a reservoir of fluid or compressed gas; i.e. they contain the same fluid or the same gas at a pressure necessary for optimum service and operation of the equipment to be supplied.

The pressure is, for example, greater than $2 \times 10^5$ Pa (Pascal) and preferably between $5 \times 10^5$ Pa and $10 \times 10^5$ Pa.

For example, six cavities may be filled with the same fluid or gas. The space defined by the cavities of the group represents a volume making it possible to advantageously replace a reservoir.

Each cavity 124 of the group 132 is preferably insulated from each other cavity of this group 132.

Alternatively, a plurality of cavities 124 of the group 132 of cavities 124 may communicate with each other to form a common space.

The integration of the passage of fluid or compressed gas in the wall can greatly reduce the size, allowing easier integration of additional elements in the interior such as luggage racks and other interior furnishings.

Technical areas previously dedicated to storage functions in the form of a fluid or gas reservoir may be freed. In particular, this allows the interior of the trains to be improved.

Furthermore, this bodywork structure does not require additional parts for the passage of fluid or gas, which thus reduces the weight of the body, and thus the energy consumption of the vehicle.

In addition, the provision of cavities in the wall does not require additional operations in the machining of said wall, so that the bodywork structure is easy to produce.

The invention claimed is:

1. Bodywork structure for a body for a public transport vehicle, comprising a wall formed of one piece and extending in a longitudinal direction, the wall comprising:
    at least one cavity extending in the longitudinal direction, the at least one cavity providing a passage for a fluid under pressure;
    an inner face;
    an outer face;
    ribs connecting the inner face and the outer face, each cavity being defined between said inner face, said outer face and two adjacent ribs; and
    at least one opening into the cavity, completely covered by a connecting plate that is welded to the wall, the connecting plate comprising an orifice.

2. Bodywork structure according to claim 1, wherein said at least one cavity provides a passage for a gas under pressure.

3. Bodywork structure according to claim 1, wherein the pressurized fluid has a pressure greater than $2 \times 10^5$ Pa (Pascal).

4. Bodywork structure according to claim 3, wherein the pressure of the pressurized fluid is between $5\times10^5$ Pa and $10\times10^5$ Pa.

5. Bodywork structure according to claim 1, said wall having a length in the longitudinal direction, and said at least one cavity extending over the entire length of said wall in the longitudinal direction.

6. Bodywork structure according to claim 5, wherein said at least one cavity has a constant profile over the entire length of said wall in the longitudinal direction.

7. Bodywork structure according to claim 1, wherein said wall comprises a plurality of cavities, at least one group of said cavities being a fluid or compressed gas reservoir.

8. Bodywork structure according to claim 1, comprising a plurality of cavities, each cavity being insulated from each other cavity.

9. Body for a railway vehicle or guided road transport vehicle, comprising a bodywork structure according to claim 1, said at least one cavity comprising a fluid or a gas under pressure, while said wall at least partially defines a vehicle interior of the body.

10. Body according to claim 9, wherein said at least one cavity is provided at one end with at least one connecting element and/or at least one distribution element and/or at least one end plug.

11. Bodywork structure according to claim 1, wherein the orifice is connected to a duct to allow passage of fluid or gas from the cavity to the duct, or vice versa.

12. Bodywork structure according to claim 1, wherein the connecting plate comprises a valve for controlling the quantity of fluid or gas passing through the orifice.

\* \* \* \* \*